United States Patent Office 3,066,156
Patented Nov. 27, 1962

3,066,156
NOVEL METHOD FOR PREPARING DISULFAMYL-
ANILINE COMPOUNDS
Carl Ziegler, Glenside, Pa., assignor to Merck & Co., Inc.,
Rahway, N.J., a corporation of New Jersey
No Drawing. Filed Jan. 4, 1960, Ser. No. 25
8 Claims. (Cl. 260—397.7)

This invention is concerned with a novel method for preparing disulfamylaniline compounds wherein the sulfamyl groups are unsymmetrically substituted, and with the novel compounds thus prepared.

The preparation of unsymmetrically substituted 2,4-disulfamylanilines by the stepwise amidation of the aniline-2,4-disulfonyl chloride, if feasible, would present difficulties in isolation and separation. Stepwise introduction of the sulfonic acid moieties also is not a feasible method for obtaining the unsymmetrically substituted disulfamylanilines because when the sulfonic acid radical is converted into the sulfamyl group it is not possible to introduce a second sulfonyl chloride into the nucleus without decomposing the sulfamyl group to the sulfonyl chloride upon treatment with chlorosulfonic acid. While other methods have been devised for preparing unsymmetrically substituted disulfamyl-aniline compounds, where they are successful they are generally complicated methods which involve multi-step procedures and often require starting materials which are not readily obtainable in large supply.

It was discovered, however, that treatment of a benzothiadiazine compound with chlorosulfonic acid under mild conditions selectively converts the 7-sulfamyl substituent [which may be unsubstituted or substituted on the sulfamyl nitrogen, and which is attached to the benzothiadiazine nucleus] to the sulfonyl chloride group and, when the nitrogen atom in the 2-position has attached to it an alkyl or an aryl radical the benzothiadiazine ring will open when poured into water to give a 2-alkyl- or 2-arylsulfamylaniline-4-sulfonyl chloride which then can be reacted with ammonia or a primary or secondary amine to form the desired sulfamyl substituent in the 4-position.

When hydrogen is attached to the amino nitrogen in the 2-position of the benzothiadiazine ring, treatment with chlorosulfonic acid under mild conditions converts the sulfamyl substituent attached to the 7-position to a sulfonyl chloride which then may be treated with water without cleaving the ring. However, upon treatment with a primary or secondary amine, ring cleavage occurs along with the conversion of the 7-sulfonyl chloride group to the 7-sulfamyl group. A 2,4-disulfamylaniline compound can thus be formed wherein the 4-sulfamyl group contains one or two substituents attached to its nitrogen atom or wherein its nitrogen atom is included in a heterocyclic ring such as in the piperidine, pyrrolidine, or morpholine structure.

The conversion of the 7-sulfamyl group attached the benzothiadiazine nucleus to the sulfonyl chloride group occurs readily upon treatment with chlorosulfonic acid advantageously with slight heating. Amidation either with ammonia or with a primary or secondary amine occurs at room temperature or, if desired, the reaction can be accelerated by slight warming for a short period of time, usually one to two hours being adequate for the reaction to take place.

In addition to chlorosulfonic acid, fluorosulfonic acid also can be employed in the novel process of this invention.

The products prepared by the novel method of this invention possess diuretic properties and thus are useful in therapy particularly in the treatment of congestive heart failure and other abnormalities which produce an edematous condition in the body or which produce an imbalance in the electrolyte concentration in the body, for example, those in which retention of sodium occurs.

The novel method of this invention can be used to prepare compounds having the following general formula which are especially useful diuretic agents

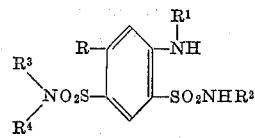

wherein R is a halogen such as chlorine, bromine, fluorine or a halogen-like radical as a trihalomethyl, for example the trifluoromethyl or trichloromethyl and the like, a lower alkyl, a lower alkoxy, or nitro; $R^1$ is hydrogen or a lower alkyl radical, $R^2$ represents hydrogen, a lower alkyl, an aralkyl, or an unsubstituted or substituted aryl radical such as the phenyl or halophenyl and the like radicals; and $R^3$ and $R^4$ can be alike or dissimilar and can be hydrogen, lower alkyl, lower alkenyl or the alkyl groups can be joined with the nitrogen atom to which they are attached to form a heterocyclic ring such as the piperidine, morpholine or pyrrolidine ring.

The sulfamyl-benzothiadiazine-1,1-dioxide compounds employed as starting materials in the novel process of this invention can be prepared by methods described in U.S. Patents 2,809,194, 2,910,473, or by the methods described by Parke et al. in the 1950 issue of Journal of the Chemical Society, page 1760, or by the method of Freeman et al. described in the Journal of Organic Chemistry, volume 16, page 815 (1951), or by the methods described in one or more of the papers referred to in the bibliography of either one of the journal references.

The novel method of this invention, and the novel compounds prepared thereby are more fully described by the following examples. It is to be understood, however, that the examples are illustrative of the novel process and compounds of this invention and are not to be construed as limiting the invention to the particular conditions specifically recited therein nor to the application of the novel process to the particular starting material specifically recited, as the process can be applied to many benzothiadiazine compounds provided they have a sulfamyl substituent attached to the benzenoid portion of the nucleus.

EXAMPLE 1

2-Methylsulfamyl-4-Sulfamyl-5-Chloroaniline

Step A.—A solution of 68.3 g. of 2-methyl-6-chloro-7-methylsulfamyl-1,2,4-benzothiadiazine-1,1-dioxide in 150 ml. of chlorosulfonic acid is heated for 5 hours on the steam bath (95° C.). The solution then is cooled and poured onto crushed ice whereupon a precipitate forms which is removed by filtration and then air-dried. After recrystallization from a mixture of acetone-hexane, there is obtained 43.2 g. of 2-methylsulfamyl-5-chloroaniline-4-sulfonyl chloride, M.P. 159–162° C.

Analysis.—Calculated for $C_7H_8Cl_2N_2O_4S_2$: C, 26.34; H, 2.53; N, 8.78. Found: C, 26.99; H, 2.64; N, 8.72.

Step B.—The sulfonyl chloride (43.2 g.) obtained as described in Step A is added to 250 ml. of 28% ammonium hydroxide and the solution then is heated on the steam bath for one hour. After cooling a precipitate forms which is separated by filtration and air dried yielding 25.2 g. of 2-methylsulfamyl-4-sulfamyl-5-chloroaniline, M.P. 185–188° C. Recrystallization from water raises the melting point to 189–191° C. An isomorphic form also exists that melts at 168–170° C.

Analysis.—Calculated for $C_7H_{10}ClN_3O_4S_2$: C, 28.05; H, 3.36; N, 14.02. Found: C, 28.19; H, 3.41; N, 13.95.

EXAMPLE 2

2-(p-Chlorophenylsulfamyl)-4-Sulfamyl-5-Chloroaniline

*Step A.*—To 25.6 g. of p-chloroaniline in 100 ml. of dry pyridine, 32.4 g. of 5-chloroaniline-2,4-disulfonyl chloride is added in portions with cooling. After the addition is complete, the solution is heated for one hour on the steam bath. About half the solvent then is removed under reduced pressure and water is added. The sticky mass thus formed is acidified with dilute hydrochloric acid thus yielding 58.8 g. of 5-chloroaniline-2,4-bis(p-chlorosulfonanilide), M.P. 175–180° C. Recrystallization from alcohol raises the melting point to 192–194° C.

*Step B.*—Twenty grams of the above compound is heated in 50 ml. of ethylorthoformate at 120–130° C. for one hour. The reaction then is cooled and the precipitate which forms is separated by filtration and air-dried yielding 13.8 g. of 2-(p-chlorophenyl-6-chloro-7-(p-chlorophenylsulfamyl) - 1,2,4 - benzothiadiazine-1,1-dioxide, M.P. 248–250° C. Upon recrystallization from 500 ml. of acetonitrile, 11.4 g. of product is obtained, melting at 248–250° C.

*Analysis.*—Calculated for $C_{19}H_{11}Cl_3N_3O_4S_2$: C, 44.24; H, 2.15; N, 8.15. Found: C, 44.17; H, 2.55; N, 8.11.

*Step C.*—A solution of 35.5 g. of 2-(p-chlorophenyl)-6-chloro-7-(p-chlorophenylsulfamyl) - 1,2,4 - benzothiadiazine-1,1-dioxide in 125 ml. of chlorosulfonic acid is treated in the manner described in Example 1, Step A. The air-dried product upon recrystallization from benzene gives 15.3 g. of 2-(p-chlorophenylsulfamyl)-5-chloroaniline-4-sulfonyl chloride, M.P. 180–182° C.

*Analysis.*—Calculated for $C_{12}H_9Cl_3N_2O_4S_2$: C, 34.67; H, 2.18; N, 6.24. Found: C, 35.46; H, 2.25; N, 6.38.

*Step D.*—By reacting 13.3 g. of the above sulfonyl chloride with 100 ml. of 28% ammonium hydroxide, according to the procedure described in Example 1, Step B, there is obtained 11.2 g. of 2-(p-chlorophenylsulfamyl)-4-sulfamyl-5-chloroaniline, M.P. 198–203° C. Recrystallization from alcohol raises the melting point to 213–215° C.

*Analysis.*—Calculated for $C_{12}H_{11}Cl_2N_3O_4S_2$: C, 36.37; H, 2.80; N, 10.60. Found: C, 36.83; H, 2.92; N, 9.89.

EXAMPLE 3

2-Methylsulfamyl-4-Allylsulfamyl-5-Chloroaniline

Twenty-three grams of 2-methylsulfamyl-5-chloroaniline-4-sulfonyl chloride, obtained as described in Example 1, Step A, is added to 20 g. of freshly distilled allylamine while the reaction mixture is cooled in an ice-bath. The reaction is allowed to stand one hour and then is heated for half an hour on the steam-bath. Ice then is added and the precipitate which is formed is separated by filtration yielding 18.2 g. of 2-methylsulfamyl-4-allylsulfamyl-5-chloroaniline, M.P. 141–144° C. Recrystallization from water raises the melting point to 145–147° C.

*Analysis.*—Calculated for $C_{10}H_{14}ClN_3O_4S_2$: C, 35.34; H, 4.15; N, 12.37. Found: C, 35.37; H, 4.17; N, 12.36.

EXAMPLE 4

2-Sulfamyl-4-Methylsulfamyl-5-Chloroaniline

*Step A.*—A solution of 30 g. of 6-chloro-7-sulfamyl-1,2,4-benzothiadiazine-1,1-dioxide in 150 ml. of chlorosulfonic acid is heated on the steam bath (95° C.) for two hours. The reaction mixture then is cooled and thereafter poured onto crushed ice. The product which precipitates is removed by filtration and air-dried yielding 30.3 g. of 6-chloro-1,2,4-benzothiadiazine-1,1-dioxide-7-sulfonyl chloride, M.P. 250–253° C. Recrystallization from a mixture of acetone and hexane raises the melting point to 259–261° C.

*Analysis.*—Calculated for $C_7H_4Cl_2N_2O_4S_2$: C, 26.67; H, 1.28; N, 8.89. Found: C, 26.98; H, 1.43; N, 8.83.

*Step B.*—A 10 g. sample of the above sulfonyl chloride is added to 25 ml. of liquid methylamine. The excess amine is allowed to evaporate spontaneously and the residue then is heated at 95° C. for 2 hours in 100 ml. of 5% sodium hydroxide. Upon acidification with dilute hydrochloric acid, 7.0 g. of 2-sulfamyl-4-methylsulfamyl-5-chloroaniline is obtained, M.P. 178–180° C. Recrystallization from water raises the melting point to 181–183° C.

*Analysis.*—Calculated for $C_7H_{10}ClN_3O_4S_2$: C, 28.05; H, 3.36; N, 14.02. Found: C, 28.22; H, 3.54; N, 14.05.

EXAMPLE 5

2-Sulfamyl-4-Dimethylsulfamyl-5-Chloroaniline

*Step A.*—Twenty-five grams of 6-chloro-1,2,4-benzothiadiazine-1,1-dioxide-7-sulfonyl chloride, prepared as described in Example 4, Step A, is added to 50 ml. of liquid anhydrous dimethylamine and the amine then is allowed to evaporate at room temperature. The residue obtained is crystallized from alcohol to yield 18.8 g. of 2-dimethylaminomethylenesulfamyl - 4 - dimethylsulfamyl-5-chloroaniline, M.P. 195–197° C.

*Analysis.*—Calculated for $C_{11}H_{17}ClN_4O_4S_2$: C, 35.81; H, 4.65; N, 15.19. Found: C, 35.81; H, 4.72; N, 15.10.

*Step B.*—A suspension of 18.7 g. of the product obtained in Step A in 30 ml. of 10% sodium hydroxide is heated on the steam bath for one hour. Complete solution results in half an hour. The reaction mixture then is acidified with dilute hydrochloric acid to yield 15 g. of 2-sulfamyl-4-dimethylsulfamyl-5-chloroaniline, M.P. 158–160° C.

*Analysis.*—Calculated for $C_8H_{12}ClN_3O_4S_2$: C, 30.62; H, 3.86; N, 13.39. Found: C, 30.75; H, 3.93; N, 13.41.

EXAMPLE 6

2-Sulfamyl-4-Isopropylsulfamyl-5-Chloroaniline

By replacing the methylamine employed in Example 4, Step B, by isopropylamine and following substantially the same procedure described in Example 4, Step B, there is obtained 2 - sulfamyl-4-isopropylsulfamyl-5-chloroaniline, M.P. 208–210° C.

*Analysis.*—Calculated for $C_9H_{14}ClN_3O_4S_2$: C, 32.97; H, 4.30; N, 12.82. Found: C, 33.25; H, 4.29; N, 12.80.

EXAMPLE 7

2-Sulfamyl-4-Pyrrolidylsulfonyl-5-Chloro-N-Methylaniline

By replacing the benzothiadiazine employed in Example 4, Step A by an equivalent quantity of 4-methyl-6-chloro-7-sulfamyl-1,2,4-benzothiadiazine-1,1-dioxide, and then in Step B replacing the methylamine by an equivalent quantity of pyrrolidine, and following substantially the same procedures described in Example 4, Steps A and B, there is obtained 2-sulfamyl-4-pyrrolidylsulfonyl-5-chloro-N-methylaniline.

EXAMPLE 8

2-Sulfamyl-4-Morpholinylsulfonyl-5-Bromoaniline

By replacing the benzothiadiazine employed in Example 4, Step A by an equivalent quantity of 6-bromo-7-sulfamyl-1,2,4-benzothiadiazine-1,1-dioxide and then replacing the methylamine employed in Step B of Example 4 by an equivalent quantity of morpholine, and following substantially the same procedures described in Steps A and B of Example 4, there is obtained 2-sulfamyl-4-morpholinylsulfonyl-5-bromoaniline.

EXAMPLE 9

2-Sulfamyl-4-Piperidylsulfonyl-5-Methylaniline

By replacing the benzothiadiazine employed in Example 4, Step A by an equivalent quantity of 6-methyl-7-sulfamyl-1,2,4-benzothiadiazine-1,1-dioxide and then replacing the methylamine employed in Step B of Example 4 by an equivalent quantity of piperidine, and following substantially the same procedures described in Steps A and B of Example 4, there is obtained 2-sulfamyl-4-piperidylsulfonyl-5-methylaniline.

EXAMPLE 10

2-Sulfamyl-4-Diethylsulfamyl-5-Methoxyaniline

By replacing the benzothiadiazine employed in Step A of Example 4 by an equivalent quantity of 6-methoxy-7-sulfamyl-1,2,4-benzothiadiazine-1,1-dioxide and then replacing the methylamine employed in Step B by an equivalent quantity of diethylamine, and following substantially the same procedures described in Example 4, Steps A and B, there is obtained 2-sulfamyl-4-diethylsulfamyl-5-methoxyaniline.

EXAMPLE 11

2-Sulfamyl-4-Methylethylsulfamyl-5-Nitro-N-Ethylaniline

By replacing the benzothiadiazine employed in Step A of Example 4 by an equivalent quantity of 4-ethyl-6-nitro-7-sulfamyl-1,2,4-benzothiadiazine-1,1-dioxide and then replacing the methylamine employed in Step B thereof by an equivalent quantity of methylethylamine, and following substantially the same procedures described in Example 4, Steps A and B, there is obtained 2-sulfamyl-4-methylethylsulfamyl-5-nitro-N-ethylaniline.

EXAMPLE 12

2-Sulfamyl-4-Methylsulfamyl-5-Trifluoromethylaniline

*Step A.*—2-amino-4-trifluoromethylbenzenesulfonic acid (32 g. 0.132 mole) is added portionwise with stirring to 100 ml. of chlorosulfonic acid, cooled in an ice-bath over a 5-10 minute period. The solution then is heated in an oil bath at 150° C. for 3 hours and thereafter cooled to 20° C. Thionyl chloride (40 ml.) is added and the mixture heated on the steam bath for 1 hour, then colled to 0° C. and poured cautiously onto ice. The aqueous liquor is decanted and the residual solid heated on the steam bath with 500 ml. of 28% ammonium hydroxide for 2 hours. Upon cooling the product which separates is collected on the filter, washed with water and dried. To remove a trace amount of 2-sulfamyl-5-trifluoromethylaniline that is obtained along with the product, the material remaining on the filter is digested with 500 ml. of boiling benzene, filtered and the benzene soluble material recrystallized from aqueous alcohol. 2,4-disulfamyl-5-trifluoromethylaniline is thus obtained as colorless needles, M.P. 241–242° C.

*Step D.*—A solution of the thus obtained 2,4-disulfamyl-5-trifluoromethylaniline in 25 ml. of 98–100% formic acid is heated under reflux for 2 hours. After removal of 10–15 ml. of solvent by distillation, the mixture is cooled in an ice-bath and the end product collected, crystallized from alcohol-hexane yielding 6-trifluoromethyl-7-sulfamyl-1,2,4-benzothiadiazine-1,1-dioxide as colorless needles, M.P. 294–295° C.

*Step E.*—By replacing the benzothiadiazine employed in Example 4, Step A, by an equivalent quantity of the thus obtained 6-trifluoromethyl-7-sulfamyl-1,2,4-benzothiadiazine-1,1-dioxide and then following the same procedures described in Example 4, Steps A and B, there is obtained 2-sulfamyl-4-methyl-sulfamyl-5-trifluoromethylaniline.

The novel compounds prepared by the novel method of this invention can be put up in the usual pharmaceutical dosage forms for administration to man or animals. Dosages from about 25 mg. to about 300 mg. or more of the active ingredient can be included in the usual dosage forms such as a tablet, pill, capsule, syrup, elixir, injectable solution and the like for the symptomatic adjustment of the dosage to the individual patient. The following example illustrates only one of the many well known methods for preparing dosage forms of these compounds.

EXAMPLE 13

Compressed Tablet Comprising 50 mg. of Active Ingredient

| | Per tablet, mg. |
|---|---|
| 2-methylsulfamyl-4-sulfamyl-5-chloroaniline | 50 |
| Starch U.S.P. | 20.2 |
| Lactose | 26.5 |
| Magnesium stearate | 0.5 |
| | 97.2 |

The 2-methylsulfamyl-4-sulfamyl-5-chloroaniline, part of the starch and the lactose are mixed together and granulated with a sufficient quantity of starch paste, prepared from the balance of the starch. The granulation (14 mesh) is dried at 45° C. for 20 hours and then re-screened, 16 mesh. The magnesium stearate then is screened through a No. 90 bolting cloth onto the granulation and the entire quantity blended. The granulation is compressed into tablets of appropriate size on a machine using flat-faced, double edged punches with a score.

While the above examples describe the preparation of certain compounds which can be prepared by the novel process of this invention, and a certain specific dosage form suitable for administering the novel compounds in therapy, it is to be understood that the invention is not to be limited by the specific details included in the examples but is understood to embrace variations and modifications falling within the scope of the appended claims.

What is claimed is:

1. Process for preparing an unsymmetrically substituted disulfamylaniline, wherein the 7-sulfamyl group attached to 2-Y-1,2,4-benzothiadiazine-1,1-dioxide is converted by reaction with chlorosulfonic acid to the sulfonyl chloride group which, when Y is hydrogen, is converted to an N-substituted sulfamyl group by amidation with an amine selected from a primary amine and a secondary amine, and when Y is selected from the group consisting of lower alkyl, mononuclear-aryl-lower-alkyl, and mononuclear-aryl, the sulfonyl chloride group is amidated by reaction with a compound selected from the group consisting of ammonia and a primary- and secondary-amide of a formula dissimilar from that forming the 2-position amide group.

2. The process as claimed in claim 1, wherein the reactions are conducted with slight warming.

3. The process for preparing an unsymmetrically substituted disulfamylaniline wherein the 7-sulfamyl group attached to 2-X-1,2,4-benzothiadiazine-1,1-dioxide is converted by reaction with chlorosulfonic acid to the sulfonyl chloride group and upon treatment with ammonia yields 2-($SO_2NHX$)-4-sulfamylaniline, wherein in each of the foregoing compounds X is selected from the group consisting of lower-alkyl and halo-substituted phenyl.

4. The process as claimed in claim 3, wherein the reactions are conducted with slight warming.

5. The process as claimed in claim 3, wherein the benzothiadiazine starting material has the structure:

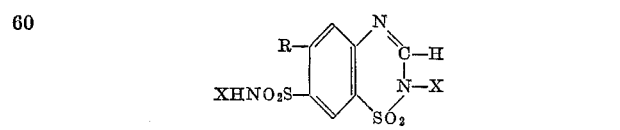

to give a compound having the structure

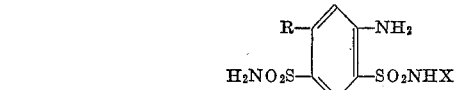

wherein in each of the foregoing structures R is selected from the group consisting of halogen, lower alkyl, lower alkoxy and nitro, and X is selected from the group consisting of lower-alkyl and halo-phenyl.

6. Process for preparing an unsymmetrically substituted disulfamylaniline wherein the 7-sulfamyl group attached to 2(4)-H-1,2,4-benzothiadiazine-1,1-dioxide is converted by reaction with chlorosulfonic acid to the 7-sulfonyl chloride group and upon treatment with an amine selected from the group consisting of mono-lower-alkyl-amine, di-lower-alkylamine, piperidine, pyrrolidine and morpholine followed by hydrolysis gives 2-sulfamyl-4- 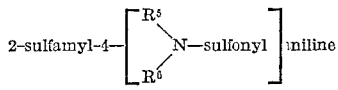 aniline wherein

is selected from the group consisting of mono-lower alkylamino, di-lower-alkylamino, piperidyl, morpholinyl and pyrrolidyl.

7. The process as claimed in claim 6, wherein the reactions are conducted with slight warming.

8. The process as claimed in claim 6, wherein the benzothiadiazine starting material is a 6-R-7-sulfamyl-1,2,4-benzothiadiazine-1,1-dioxide to give compound having the structure

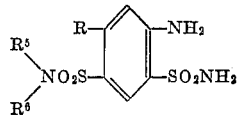

wherein in each of the foregoing compounds R is selected from the group consisting of halogen, lower alkyl, lower alkoxy, and nitro;

is selected from the group consisting of mono-lower-alkylamino, di-lower-alkylamino-piperidyl, morpholinyl and pyrrolidyl.

References Cited in the file of this patent
UNITED STATES PATENTS

| | | |
|---|---|---|
| 2,809,194 | Novello | Oct. 8, 1957 |
| 2,886,566 | Novello | May 12, 1959 |
| 2,894,948 | De Stevens et al. | July 14, 1959 |
| 2,965,656 | Novello | Dec. 20, 1960 |
| 2,979,503 | Armento et al. | Apr. 11, 1961 |

OTHER REFERENCES

Noller: Chemistry of Organic Compounds, Saunders Co., Philadelphia, pages 458–461 (1951).

Logmann et al.: Nature, vol. 182, pages 1510–1511 (1958).